United States Patent
Smith (10) Patent No.: US 7,834,920 B2
(45) Date of Patent: Nov. 16, 2010

(54) IMAGE SENSOR FOR FILTERING AND CORING PIXEL DATA AND RELATED METHODS

(75) Inventor: Stewart Gresty Smith, Lothian (GB)

(73) Assignee: STMicroelectronics (Research & Development) Limited, Marlow - Buckinghamshire (GB)

( * ) Notice: Subject to any disclaimer, the term of this patent is extended or adjusted under 35 U.S.C. 154(b) by 686 days.

(21) Appl. No.: 11/761,098

(22) Filed: Jun. 11, 2007

(65) Prior Publication Data
US 2007/0287218 A1     Dec. 13, 2007

(30) Foreign Application Priority Data
Jun. 12, 2006 (EP) .................................. 06270057

(51) Int. Cl.
*H04N 5/225* (2006.01)
(52) U.S. Cl. ...................................................... 348/251
(58) Field of Classification Search ................ 348/241, 348/242, 251
See application file for complete search history.

(56) References Cited

U.S. PATENT DOCUMENTS

| 5,481,628 | A | * | 1/1996 | Ghaderi ...................... 382/261 |
| 2002/0051088 | A1 | | 5/2002 | Ikeda et al. ................. 348/630 |
| 2003/0041084 | A1 | * | 2/2003 | Langan et al. ............... 708/819 |
| 2004/0041919 | A1 | | 3/2004 | Yamanaka ............... 348/222.1 |
| 2004/0062449 | A1 | * | 4/2004 | Chiu ........................ 382/260 |
| 2004/0169896 | A1 | | 9/2004 | Kondo ........................ 358/482 |
| 2004/0246350 | A1 | * | 12/2004 | Sakamoto .................. 348/241 |

FOREIGN PATENT DOCUMENTS

EP          0089203          9/1983

* cited by examiner

*Primary Examiner*—Jason Whipkey
(74) *Attorney, Agent, or Firm*—Lisa K. Jorgenson; Allen, Dyer, Doppelt, Milbrath & Gilchrist, P.A.

(57) ABSTRACT

A method is for filtering data output from an array of pixels in an image sensor. The method may include filtering noise from variation in pixel response across the array. An electronic device may have a device for filtering data output from an array of pixels in an image sensor. The device may include a noise filter for removing variation in pixel response across the array.

54 Claims, 6 Drawing Sheets

FIG. 1
(PRIOR ART)

|    | $C_1$ | $C_2$ | $C_3$ | $C_4$ | $C_5$ | $C_6$ | $C_7$ | $C_8$ | $C_9$ | $C_{10}$ |    |
|----|-------|-------|-------|-------|-------|-------|-------|-------|-------|----------|----|
| $R_1$ | G | R | G | R | G | R | G | R | G | R | —30 |
| $R_2$ | B | G | B | G | B | G | B | G | B | G | —32 |
| $R_3$ | G | R | G | R | G | R | G | R | G | R | —34 |
| $R_4$ | B | G | B | G | B | G | B | G | B | G | —36 |
| $R_5$ | G | R | G | R | G | R | G | R | G | R | —38 |
| $R_6$ | B | G | B | G | B | G | B | G | B | G | —40 |
| $R_7$ | G | R | G | R | G | R | G | R | G | R | —42 |
| $R_8$ | B | G | B | G | B | G | B | G | B | G | —44 |
| $R_9$ | G | R | G | R | G | R | G | R | G | R | —46 |
| $R_{10}$ | B | G | B | G | B | G | B | G | B | G | —48 |

IMAGE SENSOR FOR FILTERING AND CORING PIXEL DATA AND RELATED METHODS

FIELD OF THE INVENTION

The present invention relates to a digital filter, and in particular, to a digital filter that operates on data collected from a pixel array of a solid state image sensor.

BACKGROUND OF THE INVENTION

There is a continued desire for size reduction of solid-state camera modules, notably in the consumer mobile market. However, space saving innovations can sometimes have unwanted side effects. One of these side effects is a variation in pixel response across the array, which can arise from the design of the optical components or packaging, or from the design of the actual electronic sensor itself.

One aspect of electronic sensor design that may cause a variation in pixel response is the sharing of amplifying readout circuitry amongst groups of pixels. Typically, readout circuitry may be shared between two rows of pixels. Because the angle of incidence of light impinging on the array varies across the array, the readout circuitry provides a varying "shadowing" effect for different rows.

It is to be understood that the shadowing effect may not correspond to a visible shadow, as the dimensions are too small for this to be the case. The shadowing effect is instead to be thought of more generally as any effect that causes a decrease in the amount of light collected by the pixel under ideal operating conditions. For example, the shadowing effect may be any means that blocks or impedes photons in their path to the pixel, thus reducing the photon count over at least a portion of the pixel, or any means causing stray light gathering, that is, wherein light that should be collected by one pixel is instead collected by another.

Figure 1:
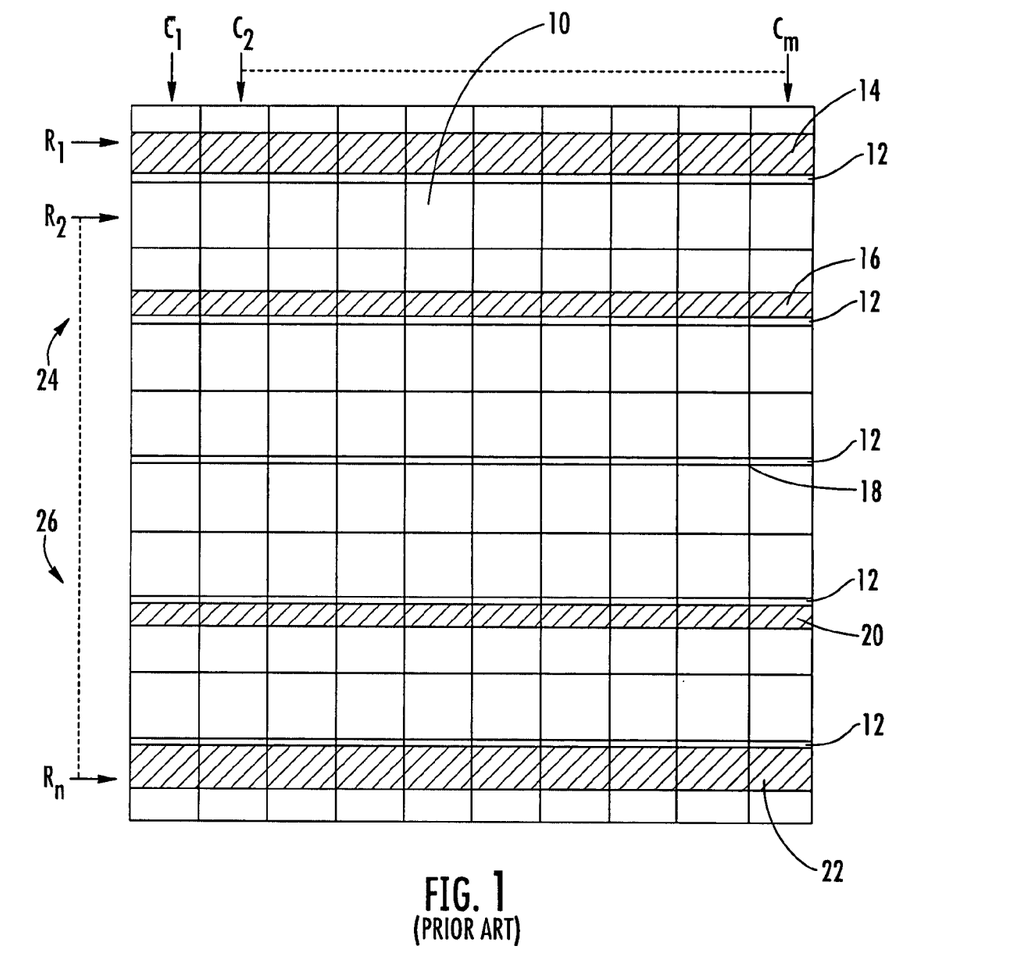
FIG. 1 illustrates an image sensor pixel array wherein readout circuitry is shared between rows, according to the prior art.

This is illustrated in FIG. 1, which shows an array of pixels 10, arranged in rows $R_1$ to $R_n$ and columns $C_1$ to $C_m$. Successive rows can be labeled as having an "odd" or an "even" parity, in accordance with the parity of the row numbering. Readout circuitry 12 is provided, and as can be seen from the figure is shared between one even and one odd row. The shadowing effect is illustrated by the regions 14-22, which represent an area of each pixel 10 that is relatively poorly exposed with respect to the remainder of the pixel. A lens (not shown) for projecting an image onto the array is cantered at the center point of the array. It can be seen that on an upper portion 24 of the array, the odd rows R1 and R3 are compromised with a shadow effect.

The magnitude of the effect may be greatest at the uppermost edge of the array, where the angle of incident light is the greatest with respect to the normal to the plane of the pixel array. This is represented by the relatively larger area of the region 14 as compared with the region 16. At the center rows R5, R6, the readout circuitry 12 may have a negligible shadow effect 18. On a lower portion 26 of the array, the even rows R8 and R10 are compromised with a shadow effect. Again, the magnitude of the effect is greatest at the uppermost edge of the array, where the angle of incident light is the greatest. This is represented by the relatively larger area of the region 22 as compared with the region 20. Because the shadowing effect changes from odd rows to even rows, it can be thought of as a signal with opposite phases on opposite sides of the pixel array.

Another aspect of electronic sensor design that may cause a variation in pixel response is the crosstalk between components that are introduced by a color filter array used in a color-sensitive image sensor. To produce a color sensitive image sensor, the pixel array is overlaid with a color filter array (CFA), so that each pixel is overlaid with a material with specific transmission characteristics so that the pixel can be thought of as being responsive to a particular color. Usually one color is overlaid per pixel. As a short-hand notation, a "red" pixel is referred to as a pixel that is sensitive to incident light having a frequency in the red part of the visible spectrum of light, with similar notations used for other colors.

Figure 2:
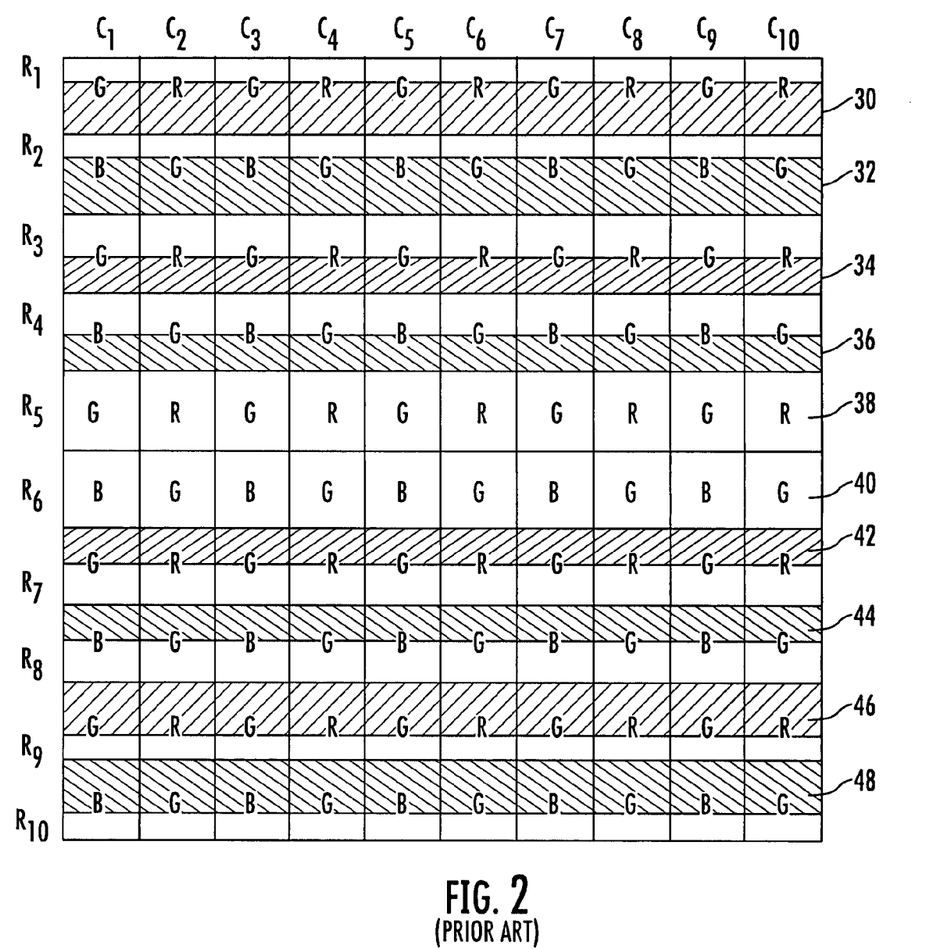
FIG. 2 illustrates the Bayer pattern color filter array, according to the prior art.

The specific frequency responses may vary according to the type of material used, among other factors. There are various well known patterns to use when depositing the color filter material. FIG. 2 illustrates the common Bayer pattern, which comprises red, green, and blue sensitive pixels, labeled R, G, B respectively. Odd rows (R1, R3 etc.) comprise alternate G and R pixels, and so can also be termed as "red" rows, while even rows (R2, R4 etc.) comprise alternate B and G pixels, and so can be termed as "blue" rows.

A source of error in color sensitive image sensors is in the cross-talk of color components, that is, sometimes a photon that passes through a portion of the CFA sensitive to one color actually impacts on the photocollection part of a pixel that is associated with another color. The photoelectric charge generated by the errant photon therefore contributes towards the wrong color channel, providing a source of noise. A uniform crosstalk component may be present, arising from the actual construction of the pixel array.

However, because the CFA has a finite thickness and is overlaid on the pixel array, there may also be a component of crosstalk noise that varies according to the angle of incident light, providing a shadowing effect in a similar fashion to that described above. The shadowing effect is illustrated by the regions 30-48 in FIG. 2. Again, it can be seen that the magnitude of the shadowing effect increases towards the edges of the pixel array, and has a phase change associated with opposite sides of the array. Also, it can be seen that in respect to the red (odd) rows, the shadowing effect comprises the interference of photons that penetrate the blue (even) rows, while for the blue (even) rows, the shadowing effect comprises the interference of photons that penetrate the red (odd) rows.

It may be appreciated that most color-sensitive image sensors may also share readout circuitry as shown in FIG. 1, and so the overall shadowing effect for a given image sensor can arise as a combination of the shared readout circuitry and the crosstalk of color components, and it may be appreciated that there are other aspects of electronic sensor design that contribute to this shadowing effect. The shadowing effect may also vary according to different scene detail and scene luminance to be imaged by the pixel array.

It is also to be appreciated that only the row-to-row variation in pixel response has been discussed and illustrated with respect to FIGS. 1 and 2. The pixel response may also vary in a similar fashion across successive columns of the pixel array. This variation is not illustrated in FIGS. 1 and 2 for the convenience of illustration. The shadowing effect when discussed in general is taken to include both row-to-row and column-to-column variation.

The shadowing effect can be further exacerbated by the design of the optical components or packaging. As camera modules become smaller, the "z-height" (the optical distance between lens and sensor surfaces) can be reduced. However, this widens the angle of incident light incident on the pixel array, and gives a greater variation of angle across the array. This itself may cause a variation in pixel response, as the photoelectric conversion of incident photons can be compromised if the photons are incident at angles that cause the generated electrons to not be collected by the charge collection wells. The increase in variation of angle can also serve to exacerbate the problems of variation of pixel response caused by the design of the actual electronic sensor itself, as described above.

In digital sampling theory, the nyquist frequency is the maximum frequency at which data can be reproduced. It corresponds to half the sampling rate of a digital system. For an image sensor, the nyquist frequency represents the maximum achievable spatial distance of an image that can be reproduced, and is equal to one half the reciprocal of the center-to-center pixel spacing. Because it varies per pixel, row, or column, the abovementioned shadowing effect therefore represents a variation of the pixel response at the nyquist frequency, which we now term for convenience as Nyquist Frequency Variation (NFV) of pixel response.

Currently, there may not be an image sensor that can cancel out NFV, as its effects have not previously been seen as significant when compared with other noise sources. However, with improvements in digital filtering, the effects of NFV are becoming more apparent to Applicant. The effect of NFV may in fact compromise the performance of key signal processing steps in the image reconstruction chain. One such step is noise reduction.

Traditionally, innate noise sources in image sensors are wideband—either Gaussian or impulsive—and techniques have been developed over the years to combat these unwelcome but well-understood defects of image data. However, NFV is narrowband, and its presence serves to alter the statistics of innate noise sources, leading to structured noise artifacts, which are much harder to separate from actual image detail and cancel. In color cameras, a further step (known as "demosaic") interpolates missing data in the sensor signal to produce a fully-sampled 3-channel color signal. Here NFV appears as a visible "linen" texture in areas of natural low-texture (e.g. blue sky), and breaks up edge detail in the scene representation. Accordingly, there may be a need for image sensors to cancel NFV.

SUMMARY OF THE INVENTION

According to a first aspect, there is provided a method of filtering data output from an array of pixels in an image sensor. The method comprises the step of filtering noise caused by variations in pixel response across the array or across a portion of the array. The step of filtering noise caused by variations in pixel response comprises obtaining a central pixel value and a plurality of neighboring pixel values, combining the neighboring pixel values to obtain an estimate pixel value co-sited with the central pixel value, comparing the central pixel value with the estimate pixel value to obtain a difference signal, and coring the difference signal.

The step of coring the difference signal may be performed according to a coring level, which defines an amount by which difference values are driven towards and not beyond zero. The coring level may be adjustable. The step of coring may further comprise the step of maintaining a running estimate of NFV magnitude and adjusting the coring level in response to different NFV magnitudes. The coring level may be modulated by the ratio of the estimated pixel value to the maximum signal measurable by a digital processing system that performs the filtering, to produce a weighted coring level.

In some embodiments, the step of combining the neighboring pixel values may comprise calculating their average value. The step of combining the neighboring pixel values may comprise the steps of: group-summing a plurality of groups of pixel values, wherein different groups of pixel values are taken from pixels aligned in different directions, and comparing the sums of two or more groups to determine at least one directional stripe value representing an image striped in a determined direction.

The step of comparing the sums of the first and second groups of pixel values may comprise subtracting the sum of the group of pixel values taken from pixels aligned in the determined direction from the sum of a second group of pixel values taken from pixels aligned in one or more chosen comparison directions. The comparison direction may be chosen to be one direction normal to the determined direction.

An angle signal to be output may be determined based on choosing the maximum value from:

(1) one or more directional stripe values;

(2) one or more predetermined stripe threshold values corresponding to a difference in signal level above which two signals are considered as belonging to different stripes, and (3) a normalized stripe value based on comparison of the central pixel value with the sum of the neighboring pixels.

If the output image angle is a directional stripe value, the pixel values in the corresponding direction only may be combined in the calculation of the estimate. Otherwise all the neighboring pixels may be combined in the calculation of the estimate. The different groups of pixel values may comprise those taken from pixels aligned in opposing diagonals. The opposing diagonals may be orthogonal and centered on and including the central pixel.

The different groups of pixel values may comprise those taken from pixels aligned in horizontal or vertical directions. The coring may be selectively applied based on a roughness measure, defined as the difference between the maximum and minimum pixel values of the neighboring pixels. The coring may be applied if the roughness is within a set threshold.

The neighboring pixel values may be neighbors in a given color plane. The step of removing variations in pixel response may comprise applying a notch filter. The notch filter may act to filter out signals at the image sensor's nyquist frequency. The step of removing variations in pixel response may comprise applying an adaptive filter.

According to a second aspect, there is provided an apparatus for filtering data output from an array of pixels in an image sensor, comprising means for filtering noise or a noise filter caused by variations in pixel response across the array or across a portion of the array. The apparatus may comprise read means or a readout circuit for obtaining a central pixel value and a plurality of neighboring pixel values, calculation means or a calculator for combining the neighboring pixel values to obtain an estimate pixel value co-sited with the central pixel value, and a coring module comprising means for comparing or a first comparator for comparing the central pixel value with the estimate pixel value to obtain a difference signal, and coring means or a coring processor for coring the difference signal.

The coring means may be adjustable to operate according to a coring level, which defines an amount by which difference values are driven towards and not beyond zero. The apparatus may further comprise monitoring means or a monitor for maintaining a running estimate of NFV magnitude and adjusting the coring level in response to different NFV magnitudes.

The coring level can be modulated by the ratio of the estimated pixel value to the maximum signal measurable by a digital processing system that comprises the filtering apparatus to produce a weighted coring level. The calculation means may comprise an average calculator or means for calculating the average value of the neighboring pixel values.

The calculation means may comprise summation means or a summer for group-summing a plurality of groups of pixel values, wherein different groups of pixel values are taken from pixels aligned in different directions, and a second comparator or comparison means for comparing the sums of two or more groups to determine at least one directional stripe value representing an image striped in a determined direction.

The comparison means may comprise subtraction means or a subtractor for subtracting the sum of the group of pixel values taken from pixels aligned in the determined direction from the sum of a second group of pixel values taken from pixels aligned in one or more chosen comparison directions. The comparison direction may be chosen to be one direction normal to the determined direction. The apparatus may further comprise angle determination means or an angle determiner comprising rank sort means or a rank sorter adapted to sort at least:

(1) one or more directional stripe values;
(2) a predetermined stripe threshold value corresponding to a difference in signal level above which two signals are considered as belonging to different stripes; and
(3) a normalized stripe value based on comparison of the central pixel value with the sum of the neighboring pixels.

The apparatus may further comprise selection means or a selector for selecting the maximum value and outputting that maximum value as the determined angle value. The apparatus may comprise decision means or a logic device for selecting a method of calculating the estimate pixel value, wherein, if the output image angle is a directional stripe value, the pixel values in the corresponding direction may be only combined in the calculation of the estimate; otherwise all the neighboring pixels may be combined in the calculation of the estimate.

The different groups of pixel values may comprise those taken from pixels aligned in opposing diagonals. The opposing diagonals may be orthogonal and centered on and including the central pixel. The different groups of pixel values may comprise those taken from pixels aligned in horizontal or vertical directions.

In some embodiments, the apparatus may further comprise signal roughness measurement means or a roughness measurer arranged to determine the difference between the maximum and minimum pixel values of the neighboring pixels, and switch means or a switch for selectively ignoring the output of the coring means based on the measured roughness.

The neighboring pixel values may be neighbors in a given color plane. The means or a noise filter for filtering noise caused by variations in pixel response may comprise a notch filter. The notch filter can act to filter out signals at the image sensor's nyquist frequency. The means for filtering noise caused by variations in pixel response may comprise an adaptive filter.

According to further aspects, an image sensor comprises the apparatus of the second aspect, and a mobile communications device, optical pointing device, or web cam comprise the image sensor.

BRIEF DESCRIPTION OF THE DRAWINGS

The present invention may now be described, by way of example only, with reference to the accompanying drawings, in which.

DETAILED DESCRIPTION OF THE PREFERRED EMBODIMENTS

As mentioned above, noise caused by variation of pixel response across the array of pixels may be a drawback of known image sensors. Because the NFV is narrowband, a first possible approach would be to deploy a fixed notch-filter at the frequency of variation of response, which in most cases may be the nyquist frequency. It can also be set at a chosen other frequency for special case image sensors.

While this approach may be the preferred option for some implementations, there may be some problems associated with it. In the world of video and stills imaging, an effective notch-filter is expensive, and loss of high-frequency data (blurring) is the inevitable result of a practical filter design. For color image processing, if notch-filtering is performed before the demosaic step, the Nyquist region is relatively smaller and blurring is intensified. If performed after demosaic, any prior noise reduction is compromised as described earlier.

A further possible option that may mitigate the blurring effect is the use of an adaptive filter. Again, this approach may be preferred for some applications but in general presents some difficulties: it is difficult to separate noise and data in regions of high luminance activity. It is difficult to develop a model on which adaptation can occur, other than in regions of low textural activity where the notch-filter would bring good results anyway. Thus, the NFV tends to survive around object edges in the scene, and cancellation is only partially effective.

A further weakness of the adaptive filtering approach may be that the notch-filter may be minimum-phase, to allow fade-in and fade-out without phase-shifting. A minimum-phase notch-filter at Nyquist is difficult to achieve (the fixed-response filter does not suffer from this restriction, as a phase-shift by a fixed distance is perfectly acceptable over an entire image).

Figure 3:
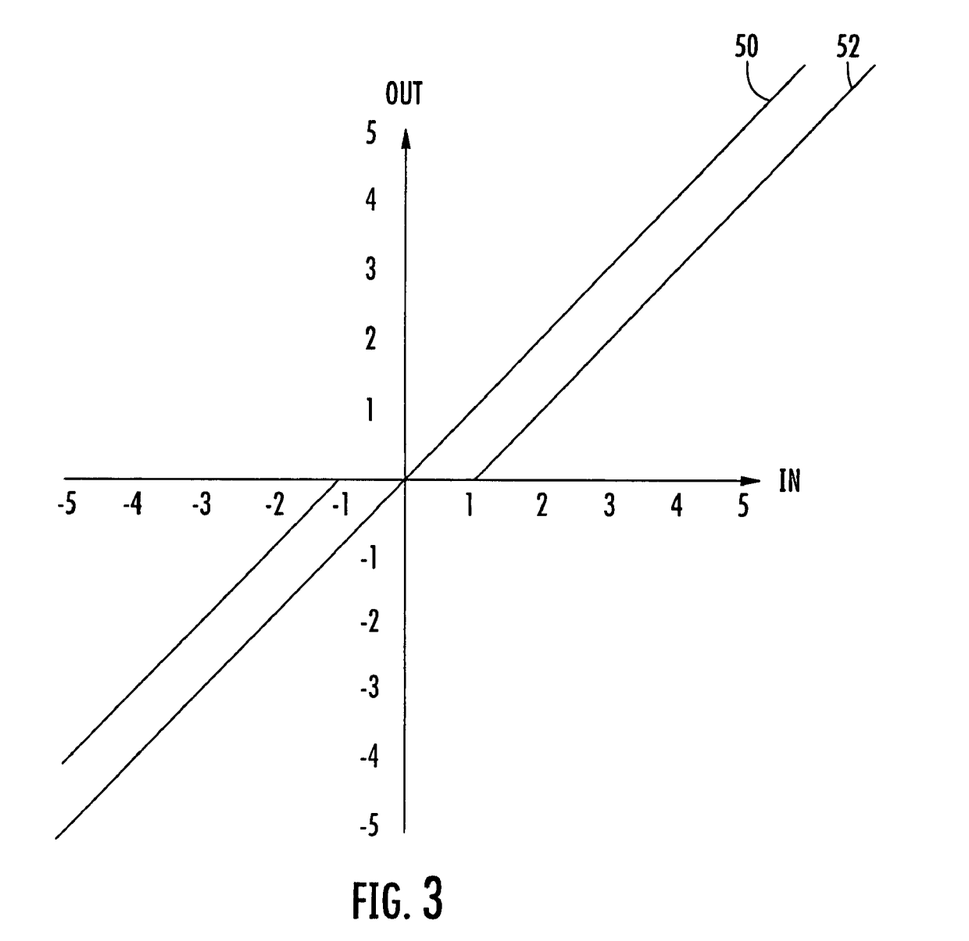
FIG. 3 illustrates the operation of a coring filter according to the present invention.

A more advanced option that avoids these problems is the use of coring. Coring is a technique, which in itself is well known. It is applied to signal differences to drive differences by a certain amount towards, but not beyond, zero. The operation of a coring function is shown in FIG. 3, which shows how an input value plotted on the x-axis is changed to an output value, plotted on the y-axis. The line 50 represents an unchanged signal, where the output is equal to the input, while the line 52 illustrates the operation of a coring function. In the illustrated example, input signals with a value above 1 are driven by a value of 1 towards zero. The values between −1 and 1 are removed. The amount by which values are driven towards zero is herein termed the "coring level". It is also sometimes known as the coring depth.

Coring does not involve neighboring pixel data, although neighboring data may have contributed to the formation of either or both of the two signals whose difference is subject to coring. Thus coring may be only applicable to minimum phase (co-sited) signal pairs. The function of coring is to drive differences by a certain amount towards, but not beyond, zero.

A common example of coring can be found in the peaking, or sharpening, of images. This signal processing step may be usually performed late in the image reconstruction chain giving a bandpass or highpass boost to image data, compensating for upstream lowpass mechanisms. As residual noise is also boosted by this process, coring can act as an effective late-stage noise reduction process, while still passing the larger signal swings which serve to sharpen image detail. Level settings may be subtle if visible image degradation is to be avoided, thus coring is not usually deployed in normal (low-noise) operation.

Cored peaking is only employed part of the time during operation of existing image sensors, and under normal operating conditions is only employed with subtle coring levels. Furthermore, peaking comes after noise-reduction and demosaic in the reconstruction chain, by which time the damage is done.

The use of peaked coring for NFV suppression has not previously been considered because the actual problem of how to remove noise caused by variation of pixel response across the array of pixels has not previously been considered. Furthermore, the coring levels for NFV suppression are much higher than that of cored peaking and may always be deployed. So the use of cored peaking for NFV suppression would be seen as too little, too late.

However, Applicant has realized that a coring method can in fact be applied to the NFV problem. This may hereafter be referred to as "nyquist coring". In this case, the model of NFV is a gain error, and the coring level is made level-dependent, i.e. it is expressed as a percentage of the signal value. We may refer to this percentage value as the "adaptive coring level". It can be varied within an image with no loss of generality. The adaptive coring level can further be modulated by the co-sited signal estimate to produce a "weighted coring level" used in the coring process.

Figure 4:
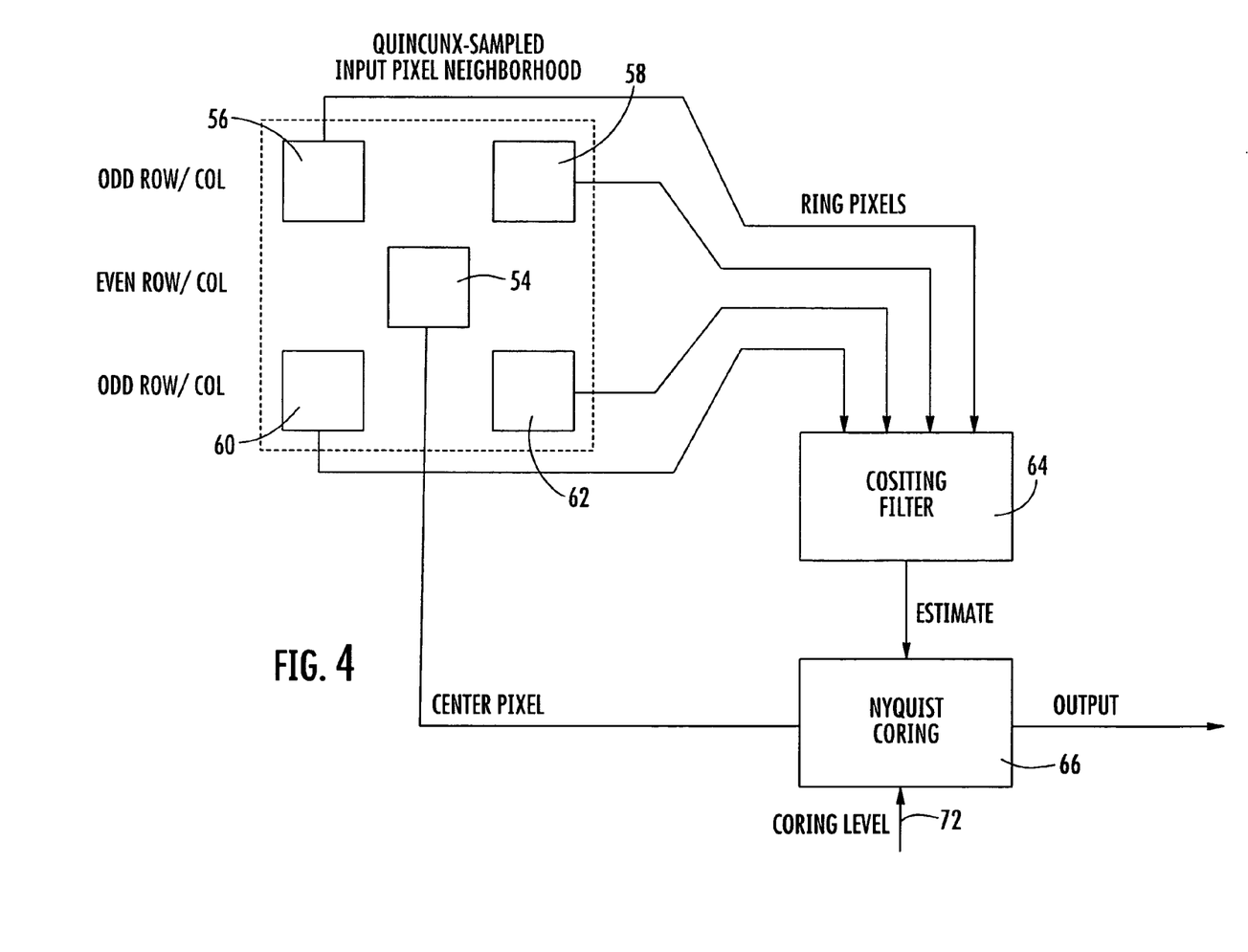
FIG. 4 schematically illustrates a digital filter according to a first embodiment of the present invention.

This coring process may now be discussed with reference to FIGS. 4 and 5. As a first step, data is co-sited, so that the minimum phase signal pairs are generated. The example shown in FIG. 4 shows an application to neighboring green pixels in a Bayer pattern. The central pixel 54 has four neighbors (ring pixels), which for convenience are labeled as north-west, north-east, south-west and south-east neighbors 56, 58, 60, 62, respectively. Note that if the center pixel is sited on an even row, the neighbors are sited on odd row and vice-versa, the same applies to columns. The values of the ring pixels are output to a cositing filter 64, which operates on them to output an estimate of the central pixel value in the absence of NFV.

The estimate and the actual value from the central pixel site are input to a nyquist coring module 66. The difference between this estimate and the actual value at the site then represents the NFV, and is cored-out if below the set coring level.

The scope of the invention is not limited to any particular cositing filter design. One possible option is to simply calculate the average of the neighbors. However, an improved version can make use of an adaptive gradient analysis, which is illustrated in FIG. 5. An example gradient analysis means or a gradient analyzer 68 is shown in FIG. 5. The sum of each diagonal and the sum of all the ring pixels are calculated. An orthogonal stripe value is calculated, which is defined as the absolute value of {(4*central pixel value)−(the ring sum)}. This value may be small if the central pixel value 54 is close to the average of its neighboring pixels 56-62. The orthogonal stripe value is orthogonal and normalized.

A "stripe" in the north east direction is then calculated, defined as the absolute value of {(2*central pixel value)+(sum of north east pixel 58 and south west pixel 60)−(sum of north west pixel 56 and south east pixel 60)} and a "stripe" in the south east direction is calculated, defined as the absolute value of {(2*central pixel value)+(sum of north west pixel 56 and south east pixel 60)−(sum of north east pixel 58 and south west pixel 60)}.

It can be seen that if the sum of the north-east and south-west pixels 58, 60 is greater than the sum of the north-west and south-east pixels 56,62, then the value of the north-east stripe may be greater than the value of the south-east stripe. Alternatively, if the sum of the north-east and south-west pixels 58,60 is less than the sum of the north-west and south-east pixels 56, 62, then the value of the north-east stripe may be less than the value of the south-east stripe.

Furthermore, a null stripe value is also defined based on a predetermined stripe threshold. This determines the sensitivity of the gradient analysis by setting an arbitrary level for the stripe detectors, above which it is considered a stripe to be detected. The orthogonal stripe, north-east stripe, south-east stripe and the stripe threshold are then sorted by magnitude. If the maximum value is the north-east stripe, the gradient analysis means 68 outputs a "NE" angle signal, while if the maximum value is the south-east stripe, the gradient analysis means 68 outputs a "SE" angle signal. Otherwise, the angle signal is output as a null value, indicating that no discernable gradient is present.

Figure 5:
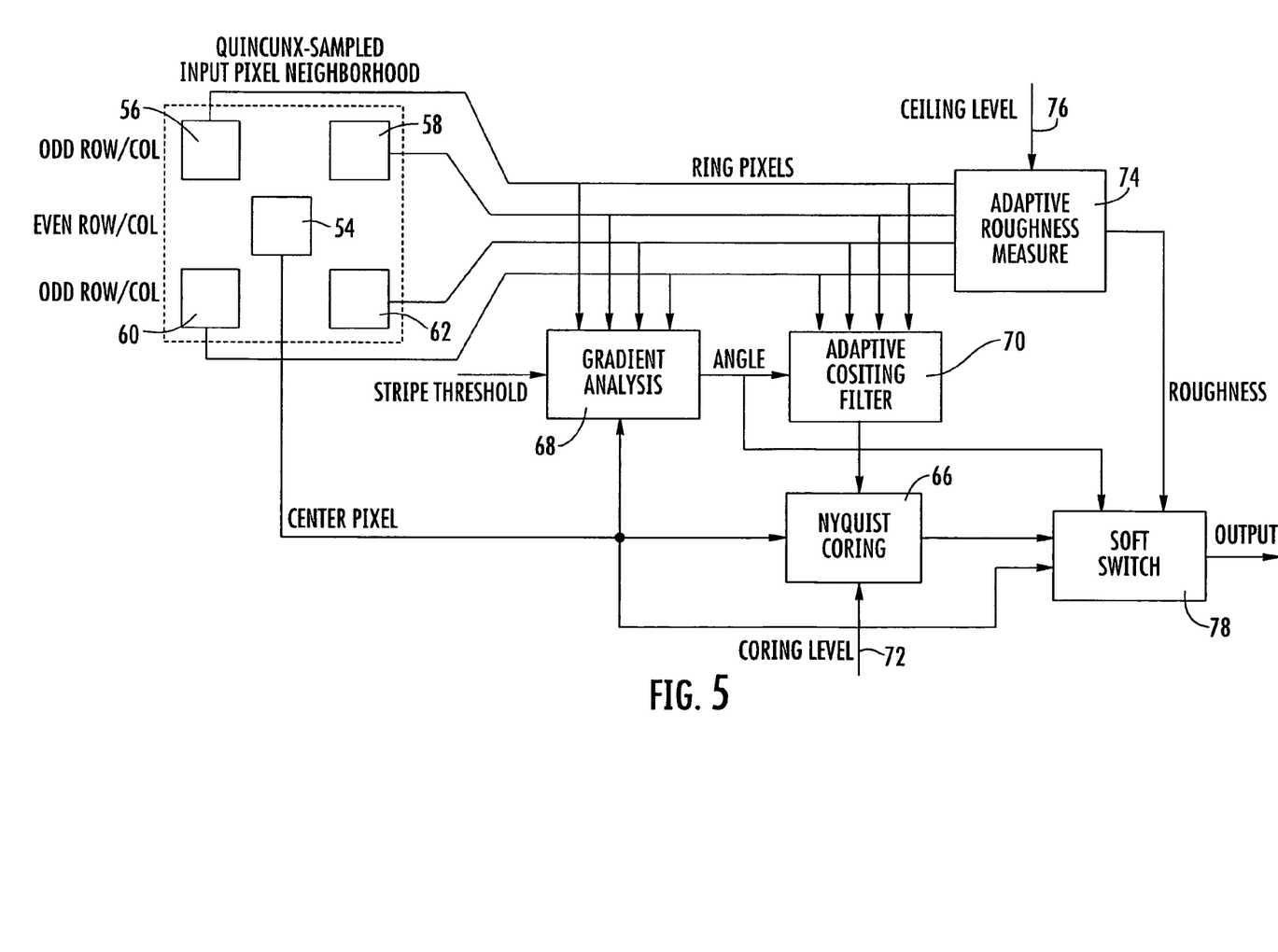
FIG. 5 schematically illustrates a digital filter according to a second embodiment of the present invention.

The output angle signal is then input to an adaptive cositing filter means or a cositing filter (70 in FIG. 5). If an "NE" angle is input, the adaptive cositing filter 70 uses the average of the north east and south west pixels 58,60 as the estimate to be output, while if a "SE" angle is input, the adaptive cositing filter 70 uses the average of the north-west and south-east pixels 56, 62 as the estimate to be output. However, if the angle is a null value, the estimate is calculated as the average value of the ring pixels 56-62.

It is to be appreciated that the above is only an example, and that the gradient analysis is not limited to comparison of only two diagonals. The stripe value in any determined direction can be found by comparison with any other direction, termed as a comparison direction. The comparison direction may usually be normal to the determined direction, but it does not need to be so. Also, as well as diagonal stripes that include the central pixel value, the stripes could be off-diagonal angles that include the central pixel value, other directions that do not include the central pixel value, and horizontal and/or vertical directions.

Next, the scale of the problem (how great is the maximum expected NFV at a given point) may be estimated throughout the image. As stated earlier, this is a complicated function of spatial index and of scene data. In a simple configuration a coring level 72, representing the envisaged worst-case NFV, can be set externally. However, this may inevitably result in over-attenuation of scene detail at the Nyquist frequency. Another approach is to maintain an internal estimate of NFV which maintains a running estimate of NFV magnitude and adjusts the coring level in response to different NFV conditions, as might be encountered in different regions of an image as described earlier. This allows an acceptable margin to be maintained between transmission of NFV and attenuation of scene detail.

An alternative and possibly simpler means to the same end is to use a "roughness" measure, derived from neighboring data (e.g. the difference between the brightest and darkest pixel) to inhibit coring in highly-textured regions. Here NFV is less noticeable, for example, "out in the open" (blue sky), where suppression is mandatory. A roughness measurement means or a roughness measurer 74 is illustrated in FIG. 5. It has the ring pixel values 56-62 and an adjustable ceiling level 76 as its inputs, in order to give the above-mentioned "roughness" output. The roughness measure is defined as the difference between the maximum and minimum pixel values, which can for example be determined after the values are sorted. If the roughness is found to be greater than the ceiling value, the ceiling value is output. Otherwise, the calculated roughness value is output.

The nyquist coring is carried out by coring means 66, on the basis of the cosited pixel data compared with the central pixel value 54. As mentioned above, the coring level 72 can further be modulated by the co-sited signal estimate to produce a "weighted coring level" used in the coring process.

Figure 6:
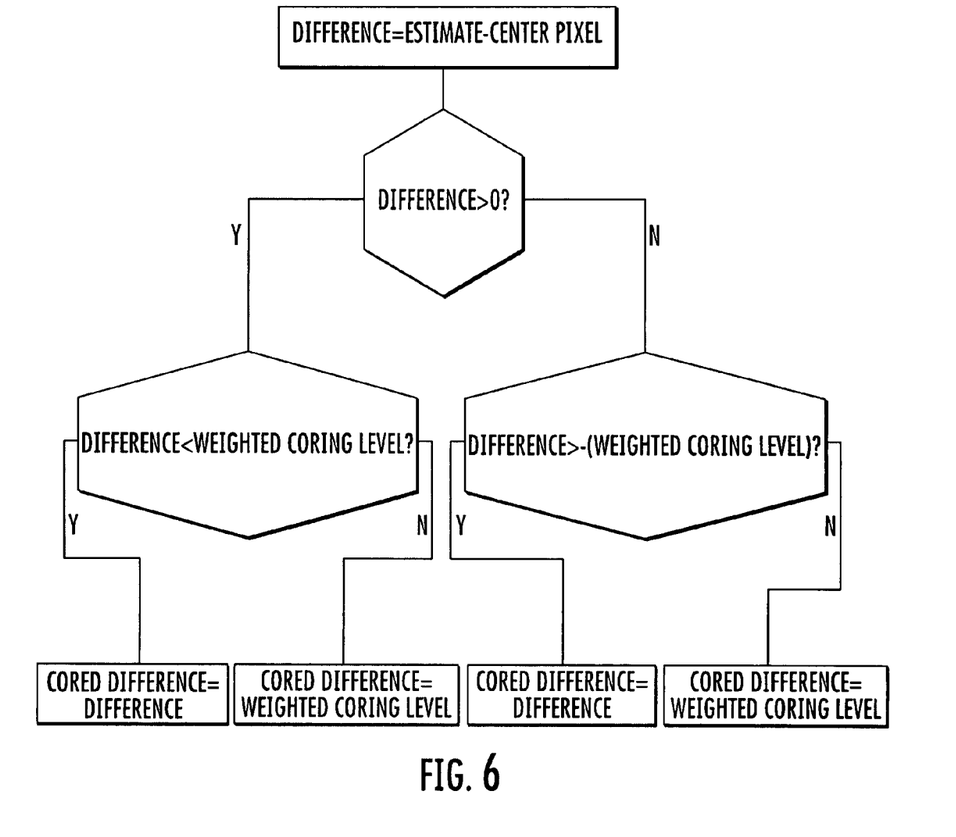
FIG. 6 illustrates the process of an aspect of a filtering step according to the present invention.

An example coring process is illustrated in FIG. 6. A weighted coring level can be defined as the {(estimate obtained from the cosited data) divided by (the maximum signal for a given system reapproach)* coring level}. A "difference" is then defined as the (estimate)−(the central pixel value). The cored difference is then set to either the "difference" or the weighted coring level, in accordance with the flow chart illustrated in FIG. 6. The nyquist cored value for the central pixel is then set at the center pixel value + the cored difference. Finally, a soft switch means or a soft switch 78 (FIG. 5) operates to output a weighted sum of the original central pixel value and the nyquist cored central pixel value, the relative weights based on inputs from the roughness measurement 74, gradient analysis 68, central pixel and the nyquist cored central pixel output.

The filter of this invention can be implemented in an image sensor and in any device incorporating the image sensor, for example, a digital still image camera, mobile communications device, optical pointing device such as an optical mouse, or a webcam, among others. Various improvements and modifications may be made to the above without departing from the scope of the invention. For example, the various "means" for performing the functions of the invention may typically comprise electrical circuits that are either programmed or programmable to implement digital filtering and signal processing algorithms. Any combination of hardware, firmware or software may be chosen as convenient. However, it may also be appreciated that the physical mechanisms may comprise other types of circuit or other types of transmission, in well known manners.

That which is claimed is:

1. A method of filtering data output from an array of pixels in an image sensor comprising:
    filtering noise from a variation in pixel response across the array of pixels in the image sensor by at least performing
        obtaining a central pixel value and a plurality of neighboring pixel values,
        combining the plurality of neighboring pixel values to obtain an estimated pixel value co-sited with the central pixel value,
        comparing the central pixel value with the estimated pixel value to provide a difference signal, and
        coring the difference signal using processor.

2. The method of claim 1 wherein the variation comprises Nyquist Frequency Variation (NFV).

3. The method of claim 1 wherein coring the difference signal is performed according to a coring level, the coring level defining an amount by which difference values are driven towards and not beyond zero.

4. The method of claim 3 wherein the coring level is adjustable.

5. The method of claim 4 wherein coring the difference signal comprises maintaining a running estimate of NFV magnitude and adjusting the coring level in response to different NFV magnitudes.

6. The method of claim 3 wherein the coring level is modulated by a ratio of the estimated pixel value to a maximum signal measurable by a digital processing system that performs the filtering to produce a weighted coring level.

7. The method of claim 1 wherein combining the plurality of neighboring pixel values comprises calculating an average value of the plurality of neighboring values.

8. The method of claim 1 wherein combining the plurality of neighboring pixel values comprises:
    summing a plurality of groups of pixel values to produce at least a first and second summed group of pixel values, each summed group of pixel values comprising pixels aligned in different directions; and
    comparing at least the first and the second summed group of pixel values to determine at least one directional stripe value representing an image striped in a determined direction.

9. The method of claim 8 wherein comparing at least the first and the second summed group of pixel values comprises subtracting the first summed group of pixel values comprising pixels aligned in the determined direction from the second summed group of pixel values taken from pixels aligned in at least one comparison directions.

10. The method of claim 9 wherein the comparison direction comprises a direction normal to the determined direction.

11. The method of claim 9 wherein an angle signal to be output is determined based upon choosing a maximum value from at least:
    at least one directional stripe values;
    at least one predetermined stripe threshold value corresponding to a difference in signal level above which two signals are considered as belonging to different stripes; and
    a normalized stripe value based on comparison of the central pixel value with a sum of the neighboring pixels.

12. The method of claim 11 wherein if an output image angle is a directional stripe value, the pixel values in the corresponding direction are combined in the calculation of the estimated pixel value; and wherein if an output image angle is not the directional stripe value, all the neighboring pixels are combined in a calculation of the estimated pixel value.

13. The method of claim 8 wherein each summed group of pixel values comprises pixels aligned in opposing diagonals.

14. The method of claim 13 wherein the opposing diagonals are orthogonal and centered on and including the central pixel.

15. The method of claim 8 wherein each summed group of pixel values comprises pixels aligned in horizontal or vertical directions.

16. The method of claim 1 wherein coring the difference signal comprises selectively coring based upon a roughness measure, being a difference between maximum and minimum pixel values of the neighboring pixels.

17. The method of claim 16 wherein coring the difference signal comprises coring the difference signal when the roughness measure is within a set threshold.

18. The method of claim 1 wherein the neighboring pixel values comprise neighboring pixel values in a given color plane.

19. The method of claim 1 wherein filtering noise from variations in pixel response comprises applying a notch filter.

20. The method of claim 19 wherein the notch filter acts to filter out signals at a Nyquist frequency of the image sensor.

21. The method of claim 1 wherein filtering noise from variations in pixel response comprises applying an adaptive filter.

22. An electronic device having a device for filtering data output from an array of pixels in an image sensor, the device comprising:
a noise filter configured to remove variation in pixel response across the array;
a readout circuit configured to obtain a central pixel value and a plurality of neighboring pixel values;
a calculator configured to combine the plurality of neighboring pixel values for obtaining an estimated pixel value co-sited with the central pixel value; and
a coring module comprising
a first comparator configured to compare the central pixel value with the estimated pixel value for producing a difference signal, and
a coring processor configured to core the difference signal.

23. The electronic device of claim 22 wherein the variation comprises Nyquist Frequency Variation (NFV).

24. The electronic device of claim 22 wherein said coring processor is configured to be adjustable to operate according to a coring level, defining an amount by which difference values are driven towards and not beyond zero.

25. The electronic device of claim 24 further comprising a monitor configured to maintain a running estimate of NFV magnitude and adjusting the coring level in response to different NFV magnitudes.

26. The electronic device of claim 25 wherein the coring level can be modulated by the ratio of the estimated pixel value to a maximum signal measurable by a digital processing system that comprises the filtering electronic device to produce a weighted coring level.

27. The electronic device of claim 22 wherein said calculator comprises an average calculator configured to provide an average value of the plurality of neighboring pixel values.

28. The electronic device of claim 22 wherein said calculator comprises:
a summer configured to sum a plurality of groups of pixel values to produce at least a first and second summed group of pixel values, each summed group of pixel values comprising pixels aligned in different directions; and
a second comparator configured to compare at least the first and the second summed group of pixel values to determine at least one directional stripe value representing an image striped in a determined direction.

29. The electronic device of claim 28 wherein said second comparator comprises a subtractor configured to subtract the first summed group of pixel values comprising pixels aligned in the determined direction from the second summed group of pixel values taken from pixels aligned in at least one comparison directions.

30. The electronic device of claim 29 wherein the at least one comparison direction comprises a direction normal to the determined direction.

31. The electronic device of claim 30 further comprising:
an angle determiner having a rank sorter configured to sort
at least
the at least one directional stripe values;
at least one predetermined stripe threshold value corresponding to a difference in signal level above which two signals are considered as belonging to different stripes; and
a normalized stripe value based on comparison of the central pixel value with a sum of the neighboring pixels; and
a selector configured to select a maximum value and outputting the maximum value as a determined angle value.

32. The electronic device of claim 31 further comprising a logic device configured to select a method of calculating the estimated pixel value; and wherein if an output image angle is a directional stripe value, the pixel values in the corresponding direction only are combined in the calculation of the estimated pixel value; and wherein if the output image angle is not the directional stripe value, all the neighboring pixels are combined in a calculation of the estimated pixel value.

33. The electronic device of claim 28 wherein each summed group of pixel values comprises pixels aligned in opposing diagonals.

34. The electronic device of claim 33 wherein the opposing diagonals are orthogonal and centered on and including the central pixel.

35. The electronic device of claim 28 wherein each summed group of pixel values comprises pixels aligned in horizontal or vertical directions.

36. The electronic device of claim 22 further comprising:
a signal roughness measurer configured to determine a difference between maximum and minimum pixel values of the plurality of neighboring pixels; and
a switch configured to selectively ignore an output of said coring processor based on a measured roughness.

37. The electronic device of claim 22 wherein the plurality of neighboring pixel values comprises neighbors in a given color plane.

38. The electronic device of claim 22 wherein said noise filter comprises a notch filter.

39. The electronic device of claim 38 wherein said notch filter is configured to filter out signals at a Nyquist frequency of the image sensor.

40. The electronic device of claim 22 wherein said noise filter comprises an adaptive filter.

41. The electronic device of claim 22 wherein the electronic device comprises at least one of a mobile communications device, an optical pointing device, and a web cam.

42. An image sensor comprising a device for filtering data output from an array of pixels in the image sensor, the device comprising:
a noise filter for removing variations in pixel response across the array;
a readout circuit for obtaining a central pixel value and a plurality of neighboring pixel values;
a calculator for combining the plurality of neighboring pixel values to obtain an estimated pixel value co-sited with the central pixel value; and
a coring module comprising
a first comparator for comparing the central pixel value with the estimated pixel value to produce a difference signal, and
a coring processor for coring the difference signal.

43. The image sensor of claim 42 wherein said coring processor is adjustable to operate according to a coring level, defining an amount by which difference values are driven towards and not beyond zero.

44. The image sensor of claim 43 further comprising a monitor for maintaining a running estimate of Nyquist Frequency Variation (NFV) magnitude and adjusting the coring level in response to different NFV magnitudes.

45. The image sensor of claim 42 wherein said noise filter comprises a notch filter.

46. A mobile communications device having an image sensor and a device for filtering data output from an array of pixels in the image sensor, the device comprising:
a noise filter for removing variations in pixel response across the array;

a readout circuit for obtaining a central pixel value and a plurality of neighboring pixel values;

a calculator for combining the plurality of neighboring pixel values to obtain an estimated pixel value co-sited with the central pixel value; and a coring module comprising
  a first comparator for comparing the central pixel value with the estimated pixel value to produce a difference signal, and
  a coring processor for coring the difference signal.

47. The mobile communications device of claim 46 wherein said coring processor is adjustable to operate according to a coring level, defining an amount by which difference values are driven towards and not beyond zero.

48. The mobile communications device of claim 47 further comprising a monitor for maintaining a running estimate of Nyquist Frequency Variation (NFV) magnitude and adjusting the coring level in response to different NFV magnitudes.

49. An optical pointing device having an image sensor and a device for filtering data output from an array of pixels in the image sensor, the device comprising:

a noise filter for removing variations in pixel response across the array;

a readout circuit for obtaining a central pixel value and a plurality of neighboring pixel values;

a calculator for combining the plurality of neighboring pixel values to obtain an estimated pixel value co-sited with the central pixel value; and a coring module comprising
  a first comparator for comparing the central pixel value with the estimated pixel value to produce a difference signal, and
  a coring processor for coring the difference signal.

50. The optical pointing device of claim 49 wherein said coring processor is adjustable to operate according to a coring level, defining an amount by which difference values are driven towards and not beyond zero.

51. The optical pointing device of claim 50 further comprising a monitor for maintaining a running estimate of Nyquist Frequency Variation (NFV) magnitude and adjusting the coring level in response to different NFV magnitudes.

52. A web cam having an image sensor and a device for filtering data output from an array of pixels in the image sensor, the device comprising:

a noise filter for removing variations in pixel response across the array;

a readout circuit for obtaining a central pixel value and a plurality of neighboring pixel values;

a calculator for combining the plurality of neighboring pixel values to obtain an estimated pixel value co-sited with the central pixel value; and a coring module comprising
  a first comparator for comparing the central pixel value with the estimated pixel value to produce a difference signal, and
  a coring processor for coring the difference signal.

53. The web cam of claim 52 wherein said coring processor is adjustable to operate according to a coring level, defining an amount by which difference values are driven towards and not beyond zero.

54. The web cam of claim 53 further comprising a monitor for maintaining a running estimate of Nyquist Frequency Variation (NFV) magnitude and adjusting the coring level in response to different NFV magnitudes.

* * * * *

UNITED STATES PATENT AND TRADEMARK OFFICE
CERTIFICATE OF CORRECTION

PATENT NO. : 7,834,920 B2  
APPLICATION NO. : 11/761098  
DATED : November 16, 2010  
INVENTOR(S) : Smith Page 1 of 1

It is certified that error appears in the above-identified patent and that said Letters Patent is hereby corrected as shown below:

Column 10, Line 28  Delete: "values"  
Insert: --value--

Column 11, Line 51  Delete: "directions"  
Insert: --direction--

Column 11, Line 58  Delete: "values"  
Insert: --value--

Signed and Sealed this

Twenty-eighth Day of June, 2011

David J. Kappos  
*Director of the United States Patent and Trademark Office*